United States Patent [19]
Kolinger

[11] 4,330,134
[45] May 18, 1982

[54] TORQUE LIMITED TRACK PIN SEAL

[75] Inventor: Kenneth J. Kolinger, Riverside, Ill.

[73] Assignee: International Harvester Company, Chicago, Ill.

[21] Appl. No.: 135,481

[22] Filed: Mar. 31, 1980

[51] Int. Cl.³ .............................................. F16J 15/34
[52] U.S. Cl. .................................... 277/42; 277/43; 277/88; 277/92; 277/95
[58] Field of Search ........................ 277/41, 42, 43, 88, 277/92, 94, 95

[56] References Cited

U.S. PATENT DOCUMENTS

| | | | |
|---|---|---|---|
| 2,307,828 | 1/1943 | Eggleston | 277/92 |
| 2,341,900 | 2/1944 | Boden | 277/92 |
| 2,784,017 | 3/1957 | Bermingham | 277/42 |
| 2,798,750 | 7/1957 | Tankus | 277/43 |
| 2,822,197 | 2/1958 | Champ et al. | 277/42 |
| 2,949,322 | 8/1960 | Closs | 277/43 |
| 3,007,724 | 7/1961 | Amirault | 277/88 |
| 3,101,954 | 8/1963 | Huddle | 277/95 |
| 3,185,488 | 5/1965 | Christensen et al. | 277/95 |
| 3,239,232 | 3/1966 | Andresen | 277/92 |
| 3,279,804 | 10/1966 | Blair | 277/92 |
| 3,330,566 | 7/1967 | Roberts | 277/92 |
| 3,341,259 | 9/1967 | Schulz et al. | 277/92 |
| 3,372,939 | 3/1968 | Coulombe et al. | 277/88 |
| 3,512,790 | 5/1970 | Mancel | 277/42 |
| 3,515,394 | 6/1970 | Stevens | 277/88 |
| 3,622,165 | 11/1971 | Hatch | 277/42 |
| 4,061,345 | 12/1977 | Lund | 277/88 |
| 4,103,906 | 8/1978 | Gits | 277/88 |
| 4,216,972 | 8/1980 | Domes et al. | 277/92 |

Primary Examiner—Robert I. Smith
Attorney, Agent, or Firm—James T. FitzGibbon

[57] ABSTRACT

A seal unit having first and second members adapted to engage, respectively, first and second sealed parts, torsionally deflectable means joining the first and second members, with the first and second members respectively having cooperating means thereon for engaging each other after a predetermined amount of free movement between them has taken place with at least one of said end members being constructed and arranged to permit movement relative to the part with which they are associated in use, whereby, the end parts do not engage each other during limited oscillation, but upon engagement, cause the driven end part to rotate to one of the sealed parts.

10 Claims, 9 Drawing Figures

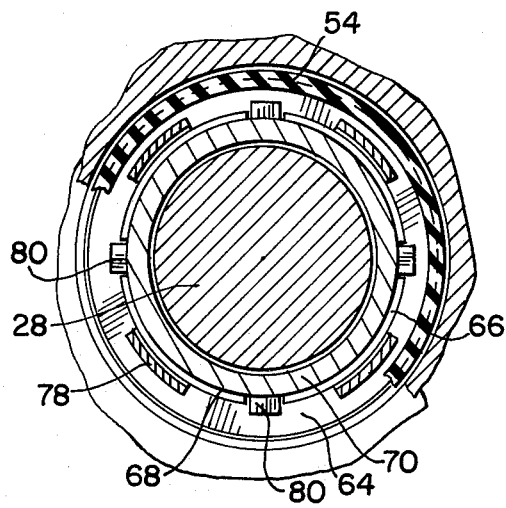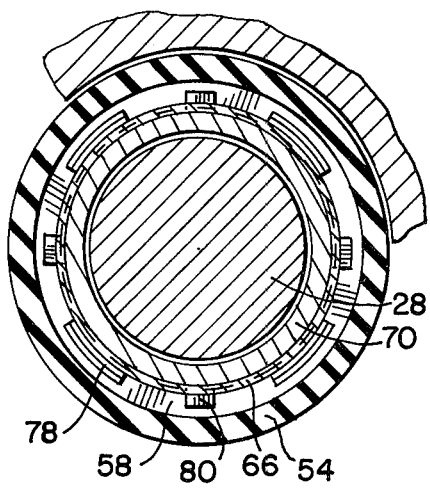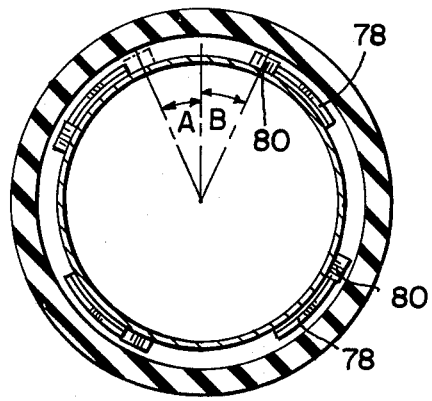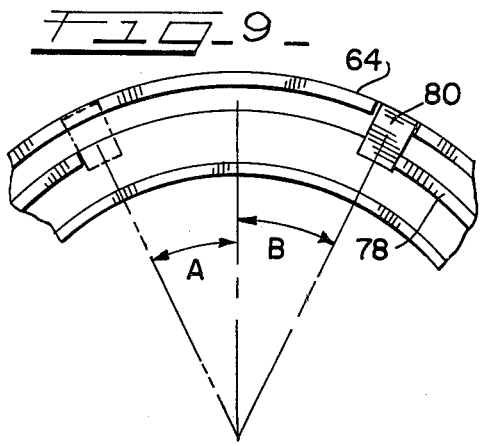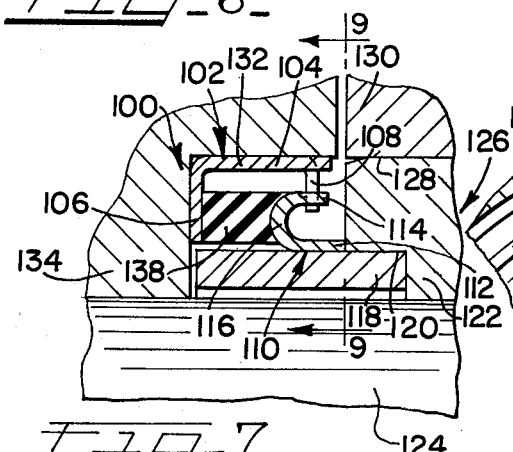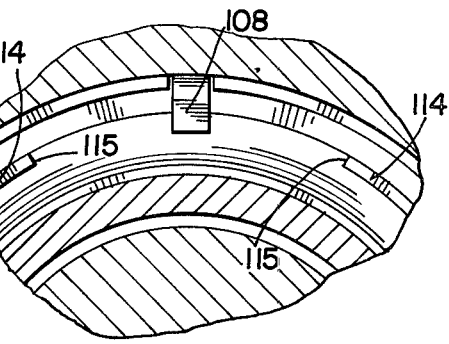

TORQUE LIMITED TRACK PIN SEAL

BACKGROUND OF THE INVENTION

The present invention relates generally to seals, and more particularly, to seals of the so-called torsional deflection type which are adapted to exclude grit from a sealed area and retain oil, grease, or other lubricant therein.

Seals made according to the present invention are particularly adapted for use in severe service environments where the relative motion between the two sealed parts comprises an oscillatory motion only of a relatively limited angular extent. In this respect, the seals are distinguished from seals wherein the sealed parts undergo one or more complete rotations relative to each other.

One advantage of torsional deflection type seals is that they make possible the retention of oil or the like within a sealed cavity without the need for two surfaces which undergo motion relative to each other. In other types of seals, oil will escape between these surfaces if they lack the requisite pressure to maintain the seal, or if they move apart for any reason. A common type of torsional deflection seal, however, uses a cylinder or similar annulus or an elastomeric material such as natural or synthetic rubber instead of two movable surfaces. This member is bonded or otherwise firmly affixed to a pair of rigid members, usually metal or the like, each of which is attached to a separate, relatively movable member.

Accordingly, in a typical torsional deflection seal, a snug secondary seal is made between one sealed part and one metal ring or the like, and a similar, snug, secondary or non-rotational seal is established between the other sealed part and the other metal ring. When the sealed parts oscillate relative to each other, the cylinder undergoes a torsional deflection action, that is, one axial end thereof rotates circumferentially relative to the other axial end, with the body of the cylinder or annulus taking the deflection by reason of its inherent elasticity.

Consequently, in seals of this type, there actually is no so-called primary seal or relative interfacial motion of elements of the seal itself, but merely two so-called secondary seals, that is, static seals at points where there is no relative rotation between the part of the seal and the other sealed part. Consequently, if the secondary seals are properly installed, there is no possibility of leakage as long as the annulus itself remains intact and bonded to the members which are installed in the relatively movable parts.

However, in torsional deflection seals of the prior art, the act of snugly fitting the metal or other bonded elements to the movable part created a problem in that, were the sealed parts ever to undergo deflection in excess of a predetermined, permitted angle, permanent damage would be done to the seal, either by way of causing the seal to take a "set" or loss of elasticity, or, in extreme cases, with failure resulting from exceeding permissible shear stresses.

Referring now to the background of the invention, it is common in the track laying vehicle industry to manufacture the track assemblies themselves in a certain location or facility, and thereupon to store these tracks until it is time for installation thereof on a vehicle. In some cases, the completed and assembled tracks are merely kept in storage for a reasonable period of time, but in other cases, the track assemblies are shipped to another location, which in some cases, is in another country, for ultimate installation on the vehicle.

During the handling which is attendant to storage and shipping, the track pins or other sealed parts are sometimes called upon to undergo torsional deflection through an angle much greater than the specified or permitted angle. In other words, if the chain is folded back upon itself, the links of the chain may undergo deflection of 40° to 55°, while in normal use, the track links would undergo an angular deviation of perhaps 20° to 35°, usually 27° to 32°, as the links are successively wrapped around, and then straightened from a drive sprocket or roller.

Accordingly, with prior art seals, there has been a problem of storage, shipping or transient handling of chains in which the links are permitted to only undergo limited angular deflection with respect to one another. In such cases, torsional deflection type seals were not used. In other cases, the chains required special handling or storage, which often constituted a significant disadvantage. In other words, if a chain could never be coiled for storage in a form requiring the links to exceed a given deflection angle, such as 15°, for example, the space required to store the chain would be excessive and would create handling problems which might, in effect, rule out the adoption of an otherwise desirable torsional deflection type seal.

Accordingly, it is an object of the present invention to provide an improved torsional deflection type track pin seal.

Another object of the invention is to provide a track pin seal which includes a pair of end members adapted to be received within portions respectively of a pair of sealed parts and to remain fixed relative to such parts under normal use, but which, under extreme conditions, may rotate relative thereto so as to avoid imposing undue strain on the elastomeric components of the seal.

Yet another object is to provide a torsional deflection type seal which, by its design, inherently limits the amount of torque or the effective angle which can be imposed upon the cylinder, annulus or other elastomeric part.

A still further object of the invention is to provide a sealed vehicle track having a plurality of seals of the improved type.

Another object of the invention is to provide a seal having a pair of end parts and an elastomeric annulus extending therebetween, with the end parts being constructed and arranged so that in normal use they do not engage each other, but when a predetermined limit of free movement is exceeded, one end part engages the other end part and causes it to rotate relative to the sealed part within which it is received.

A still further object is to provide a torsional deflection type track pin seal having driving and driven elements adapted only for intermittent engagement when angular deflection between the two sealed parts exceeds a predetermined degree.

Another object is to provide a track pin seal having first and second end caps, a generally cylindrically, axially extending, elastomeric torsional deflection element and disposed between said ends, with said two ends having means thereon for cooperative engagement after a predetermined angle of relatively free movement between such parts has occurred.

Another object is to provide a seal unit which includes a casing with a driving flange and a casing with one or more driven flanges, with the driven and driving flanges being spaced circumferentially apart from each other and being adapted for radial or axial engagement with each other after a permitted amount of free play between the units has occurred in use.

The foregoing and other objects and advantages of the invention are achieved by providing a seal unit having first and second members adapted to engage, respectively, first and second sealed parts, torsionally deflectable means joining the first and second members, with the first and second members respectively having cooperating means thereon for engaging each other after a predetermined amount of free movement between them has taken place with at least one of said end members being constructed and arranged to permit movement relative to the part with which they are associated in use, whereby, the end parts do not engage each other during limited oscillation, but upon engagement, cause the driven end part to rotate relative to one of the sealed parts.

The exact manner in which these and other objects and advantages of the invention are achieved in practice will become more clearly apparent when reference is made to the accompanying drawings showing the preferred embodiments of the invention, and in which like reference numerals indicate corresponding parts throughout the several figures.

BRIEF DESCRIPTION OF THE DRAWINGS

FIG. 4 is a vertical sectional view, on a reduced scale, taken along lines 4—4 of FIG. 3 and showing parts of the seal of the invention;

FIG. 5 is a vertical sectional view, taken along lines 5—5 of FIG. 3 and showing other elements of the seal of FIG. 3 on a reduced scale;

FIG. 6 is a vertical sectional view of the seal of FIGS. 3-5, showing the seal with one end part rotated relative to the other so as to have a driving portion thereof engaging the driven portion of the other seal;

FIG. 7 is a fragmentary, enlarged vertical sectional view of a different form of track pin seal made according to the invention;

FIG. 8 is an enlarged fragmentary end sectional view of the seal of FIG. 7; and

FIG. 9 is an enlarged vertical sectional view of the seal of FIGS. 7 and 8, showing the same with the driving and driven parts thereof engaged with each other.

DESCRIPTION OF THE PREFERRED EMBODIMENTS OF THE INVENTION

While the principles of the invention are applicable to a variety of installations, two different forms of the seal of the invention will be described in detail, each of which is advantageously used as a so-called track pin seal used to exclude mud and grit from the track pin and bushing components of an endless track of a bulldozer or other track laying vehicle.

Figure 1:
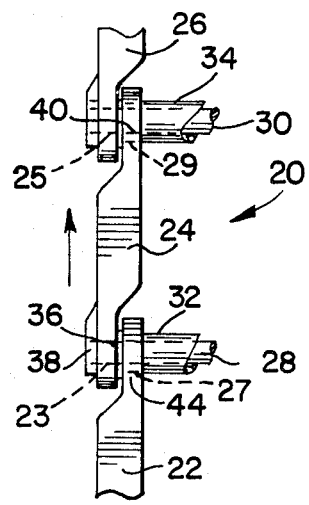
FIG. 1 is a plan view, with portions broken away, showing certain elements of the track unit adapted to be sealed by seals made according to the invention.

Referring now to FIG. 1, there is shown a portion of a track generally designated 20 and shown to include a plurality of identical links 22, 24, 26, held together by track pins 28, 30 which are in turn received within bushings 32, 34. The ends of the track pins 28, 30 are pressed through openings 23, 25 disposed in the trailing end portions of the links 24, 26, while the bushings 32, 34 are press fit into openings 27, 29 in the leading end portions of the links 22, 24. In use, the pins and their associated link ends rotate relative to bushings and their associated links ends, thus accommodating angular deflection as the track presses over the front and rear sprockets which locate and drive the track.

Thus, in referring again to FIG. 1, and assuming the motion of the track to be that shown by the arrow, the trailing portion 36 of the link 24 includes a boss 38 in which the opening 23 is formed, while the leading end portion includes a reduced thickness section 40 accommodating the openings 29.

Figure 2:
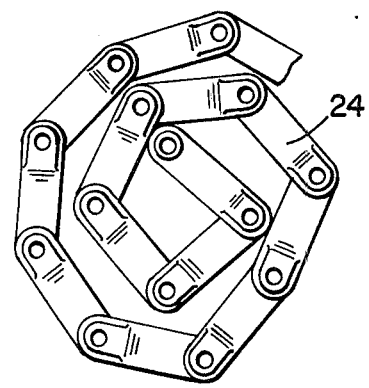
FIG. 2 is a side elevational view showing an endless vehicle track having seals made according to the invention, with the track being folded upon itself and undergoing more angular deflection between parts than would be the case in normal use thereof.

FIG. 2 is a side elevational view of the track chain when it is coiled for storage or shipping, showing the links undergoing angular deflection well in excess of that normally encountered in use of the track chain. As will appear, it is an object of the invention to provide a torsional diaphragm type track pin seal which, by reason of its construction, will accommodate such large angular deflection without damage to the seal units.

Figure 3:
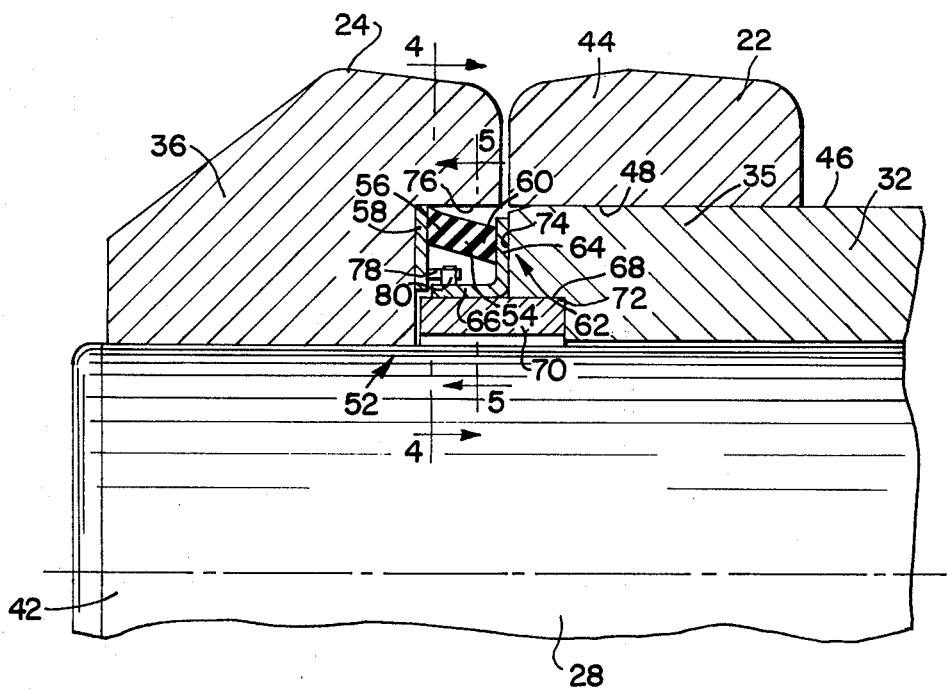
FIG. 3 is a fragmentary vertical sectional view, on an enlarged scale, showing one form of the track pin seal of the invention installed in place within a portion of a vehicle track.

Referring now to FIG. 3, there is shown an enlarged view of a track pin 28, over which is slidably received a bushing 32. The end portion 42 of the pin 28 is press fit into the opening 23 in the trailing end portion 36 of the link 24. The bushing 32 is slidably received over the track pin 28, while the end portion 35 of the bushing is press fit into the opening 27 in the leading edge portion 44 of the link 22. Accordingly, when the links 22, 24 undergo angular deflection with respect to each other, the bushing 32 and the link 22 flex together as a unit, while the pin 28 and the link 24 also flex together as a unit.

According to the invention, a seal unit, generally designated 52, is received in the assembly just described. The seal assembly 52 includes an annular, elastomeric diaphragm body 54 having one end portion 56 thereof bonded to a radially extending metal seal casing 58, and the other or axially inner end 60 thereof bonded to an L-shaped annular seal casing generally designated 62, with such casing including a radially extending flange 64 and an axially extending flange 66. The flange 66 is press fit over the outer diameter 68 of an annular spacer 70 received within a counterbore 72 formed in the track pin bushing 32. The radial flange 64 of the casing 62 lies in abutting relation with the end face 74 of the bushing 32, while the casing 58 is received snuggly within a counterbore 76 in the end portion 36 of the link 24. Consequently, in use, the seal casing 62 rotates with the link 24 and its associated bushing 32, while the casing 58 rotates with the link 24. The angular deflection between links is accommodated by a twisting or torsional movement of the elastomeric seal body 54. As will appear, the seal has a design tolerance for accommodating repeated deflections through an angle of 5° of 30°, over many millions of cycles without damage, and accordingly, in most cases, will last for the life of the sealed mechanism if operated in this mode.

Referring now to an important feature of the present invention, the seal unit 52 includes first and second, cooperating torsional accommodation flanges 78, 80. The flange 78 is formed on the casing 58, and extends axially toward the radially extending flange 80. According to the invention, as will appear, these flanges do not normally engage each other but are spaced apart in use by a working clearance equal to the permissible or designed angular deflection between the track links 22, 24. However, when this permissible or design deflection is exceeded, the two flanges engage in a cooperative or driving and driven flange arrangement, thereby causing one of the elements—in this case the casing 58—to rotate with respect to the other seal casing 62.

Referring now to FIGS. 4-6, the manner in which this action is achieved is illustrated in detail.

FIG. 4 shows that the spacer unit 70 and the axial flange of the casing 66 are received over the outer diameter 68 of the spacer 70. The radial flange 64 is shown to include a plurality of upturned or radially outwardly directed small flanges 80, while the axially extending flanges 78 are shown to have their edges spaced circumferentially well apart from the edges of the radial flanges 80. Accordingly, each flange 80 can rotate some 15° to 30° to either side of the position shown in FIG. 4 before there would be engagement between the flanges 78, 80.

Referring now to FIG. 5, which is a view similar to that of FIG. 4 but taken from an opposite direction, the elastomeric seal body 54 is shown, as are the pin 28 and the spacer 70. In this view, both groups of flanges 78, 80 are shown in elevation, but the same relation referred to earlier is preserved, that is, there is a substantial circumferential clearance between these flanges. In FIG. 5, the end portions of the radially extending flanges 58 are shown in elevation, while the axial flange portions 66 of the casing 62 are shown in section.

Referring now to FIG. 6, the same seal construction as that shown in FIGS. 4 and 5 is illustrated, except that the pin 28 and bushing 32 are not shown. However, in this view, the small radially directed or drive flanges 80 are shown to be engaged with the edge portions of the axially extending or driven flanges 78. From a consideration of FIG. 6, it will be seen that my further clockwise rotation of the elements 80 will cause the driven elements 78 and their associated flange 58 to rotate. As long as this rotation continues, both flanges will rotate together, and while the elastomeric seal body 54 has undergone a predetermined amount of deflection, it will not undergo additional deflection and hence is not stressed beyond its design limits. When the sealed parts are returned to a neutral or aligned position, such as that shown in the solid radial line of FIG. 9, the seal assembly also returns to such position and this eliminates the stress on loading on the elastomeric seal body 54.

Referring again to FIG. 6, clockwise rotation through angle "B" of a predetermined angular amount, for example 15° to 30°, can be accommodated before the driven flange 78 is engaged and rotated, and an equal degree of opposite hand rotation can occur before the driven flange is rotated in the opposite direction. In either case, additional angular rotation by one casing about their common rotational axis causes cessation of relative rotation and cause the two casings to rotate together as a unit. This rotational movement is accommodated by rotation of the casing within its associated counterbore.

Thus, referring to the embodiment of FIGS. 3-6, the casing 64 is received within a counterbore formed between the O.D. 68 of the spacer 70, while the casing 58 is received at the end surface of the counterbore 76. When link movement causes rotation of one casing beyond its defined angular limit, the other casing will rotate with respect to its counterbore or other locating element.

Accordingly, in keeping with the invention, torsional deflection seals may be provided which can be moved well beyond their design limit by reason of permitting relative rotation of one metal casing with respect to its receiving or supporting surface in a part of the sealed mechanism, and thus eliminating body-damaging extreme relative rotation between elements of the seal assembly itself.

Referring now to another embodiment of the invention, which operates on the same principle but which differes in detail, FIG. 7 shows a modified form of seal assembly generally designated 100. This unit includes a radially outer casing 102 having axial and radial mounting flanges 104, 106. The axial flange 104 includes a plurality of radially inwardly extending flanges or drive lugs 108, struck from the same metal or other casing material from which the flange 104 is made.

The seal assembly 100 also includes a second casing unit generally designated 110 having a radially inner axial flange 112, and a radially outer, discontinuous axial flange 114, such flanges 112, 114 being joined to each other by an annular flange with a curved surface or bight portion 116.

An annular spacer 118 is received within a counterbore 120 in a bushing 122 which is received in sliding fit relation over the track pin 124. The first and second casings 102, 110 are spaced apart but are joined to each other by an annular elastomeric seal body 138. Referring to FIG. 8, it will be seen that the discontinuous annular flange 114 referred to above comprises a plurality of spaced apart elements acting as driven members having end faces 115 adapted to engage portions of the driving flanges or lugs 108.

In the application shown, the first or outer casing assembly 102 is received within a counterbore 132 formed in an end cap 134 pressed over the end of the track pin 124. Other elements of the construction shown include the inner surface or bore 128 of the track link 130 which oscillates with respect to the other track link end cap 134.

In use, the form of seal shown in FIGS. 7 and 8 operates in the same manner as its counterpart in FIGS. 3-6. In other words, when the track link parts 130, 134 oscillate with respect to each other about the track pin axis, the casings 102, 110 undergo relative rotation about a common axis. If and when the degree of this rotation exceeds predetermined limits, each flange or lug 108 engages an edge 115 of the axial flange 114, causing the two casing units to rotate together as a unit rather than relative to each other.

In this instance, such rotation is again accommodated by relative rotation of at least one casing with respect to its associated part of the sealed mechanism, in this case, with respect to the spacer 118 or the counterbore 132.

While both elastomeric seal bodies illustrated are of generally annular configuration, the seal body 154 of FIG. 7 has a generally parallelogram shaped cross-section and is therefore generally frusto conical in its unstressed condition, while the cross-section of the seal body 138 is defined by three generally straight surfaces with a fourth surface being curvilinear so as to mate with the bight portion 116 of the mounting flange 110.

The dimensions of the seal bodies are not critical, it being known to those skilled in the art that certain ratios of length and width are preferred for accommodating predetermined ranges of torsional deflection in response to permissible applied forces. The bodies are preferably thick enough to be rugged and long-lived, and to resist wrinkling or other irregular deformation during deflection, but not so thick or stiff as to require excessive force to deflect through the angles intended to be accommodated.

In the foregoing description, reference has been made to certain of the lugs or flanges such as the lugs or flanges 78, 80, 108 and 114 as being the "driving" or "driven" flanges or lugs. These designations are merely for convenience, and are not intended to imply that such elements serve only as driving or driven elements, inasmuch as all the elements usually operate as both driving and driven elements depending upon the relative rotation of the flanges or mounting portions with which they are associated.

Commonly, a given flange would operate as a driving flange when the track chain is deflected excessively in one direction, but becomes the driven element when the chain is straightened and/or deflected to an opposite hand, another extreme position.

As long as the seal is initially placed in the chain so as to have no residual strain when the chain is in a straight position, and the driving lugs are centered between two driven flanges, the seal will thereafter be self-aligning and can therefore accommodate excessive movement of the track without damage.

In the embodiments shown in FIGS. 3 and 7, for example, the driving and driven lugs extend respectively radially and axially into appropriate driving/driven engagement, and are made from a metal of suitable thickness. Clearly, however, the exact size and angular disposition of the lugs or flanges is not critical as long as they permit free but limited movement throughout a range of positions, and are attached for mutual engagement at the extremes of such positional range.

Normally, a metal such as steel is used in the casing but other rigid, tough materials may prove suitable for this application. The elastomer is normally a synthetic rubber such as a nitrile rubber but other elastomers may prove suitable, depending upon the environment in which the sealed mechanism is used.

The degree of permissible angular rotation has been shown in the illustrated embodiments to be 15° to 30° of either side of a neutral position, but the more flexible the elastomeric seal body, the greater the deflection which can be accommodated. In multi-link track chains, where large diameter sprockets and final drives are used, the chain links only undergo rotation of substantially less than 30°, but other mechanisms may require significantly greater deflection and still other mechanisms may require much smaller deflection in use.

Different configurations of the casings and different mounting applications are shown, it being understood that the dimensions of the seal counterbore and other specifications of the application may determine the design of the casings. For example, the casings might be spaced radially and have a radially extending steel body rather than having axially spaced or inclined bodies shown herein.

It will thus be seen that the present invention provides a novel torsional deflection type seal having a number of advantages and characteristics, including those pointed out above and others which are inherent in the invention.

A preferred embodiment of the invention having been described by way of illustration, it is anticipated that changes and modifications in the described seal will occur to those skilled in the art and that such changes and modifications may be made without departing from the spirit of the invention or the scope of the appended claims.

I claim:

1. A seal assembly for retaining oil within, and for excluding contaminants from, a sealed region defined at least in part by at least two relatively movable parts and said seal assembly, said seal assembly comprising, in combination, first and second casings made from a relatively rigid, durable material, said casings being spaced apart from each other and arranged for relative movement about a common axis, each of said casings also including means for receiving a portion of an elastomeric seal body, a generally annular, elastomeric seal body unit having spaced apart, first and second surfaces bonded respectively to said means on said casings for receiving said portions of said seal body, each of said casings being adapted to being received within an associated part of said sealable mechanism in fluid tight relation, said seal body being adapted to undergo a predetermined angular degree of torsional deflection caused by relative rotation of said first and second casings about said common axis, said casings further including mutually engageable means adapted, in one position thereof, for driving engagement with each other, said means being angularly spaced apart to define a circumferential working clearance therebetween, said mutually engageable means being free for movement throughout a range of other positions, said mutually engageable means, in use, being thereby adapted, upon rotation of one of said casings beyond said predetermined degree of rotation, to cause said other casing to rotate together with said one casing about said axis of rotation.

2. A seal assembly as defined in claim 1 wherein said annular elastomeric seal body has a generally cylindrical configuration, with a pair of radially extending end face portions, said end faces being bonded respectively to said first and second casings.

3. A seal assembly as defined in claim 1 wherein said mutually engageable means includes a flange extending radially outwardly from an axially extending portion of said first seal casing, and the spaced apart end portions of an axially extending flange forming a part of said second seal casing.

4. A seal assembly as defined in claim 1 wherein said casings are spaced apart from each other along said common axis.

5. A seal assembly as defined in claim 1 wherein said casing elements are spaced apart from each other radially of said common axis.

6. A seal assembly as defined in claim 1 wherein said elastomeric seal body comprises a frustoconical seal body of generally parallelogram shaped cross-section, said body having a pair of radially extending, axially facing end surfaces, said end surfaces being bonded respectively to portions of said first and second casings.

7. A seal assembly as defined in claim 6 in which said mutually engageable means comprises an axially extending flange forming a part of one of said casings and in which the other of said means includes at least an end face portion of a pair of spaced apart flanges forming a part of the other of said casings.

8. A fluid seal unit comprising in combination, first and second casings, each of said casing having a mounting flange, an elastomeric seal body having portions thereof bonded to each of said mounting flanges, one of said mounting flanges including at least one driving lug extending away from said flange, the other of said flange comprising a plurality of individual flange elements spaced circumferentially apart from each other by a predetermined angular working clearance, each of said flange elements terminating in an edge portion, said flange elements being constructed and arranged with respect to said driving lugs so that, in one position of said seal, said driving lugs lie along a movement locus of said elements but are spaced from said flange edges, said driving lugs being adapted, in another position thereof, to engage said flange element edges in driving relation, said seal assembly being thereby adapted in use to operate such that limited rotation of one of said mounting flanges with respect to the other causes torsional deflection of said seal body and relative rotation of said one mounting flange with respect to said other mounting flange, and rotation of said flanges with said driving lugs beyond said predetermined degree causes mutual engagement of said lug and said flange edges, thereby causing said mounting flanges to rotate with each other, at least one of said mounting flanges being adapted to rotate with respect to the portion of a sealed mechanism with which said seal assembly is associated in use.

9. A sealed mechanism, said mechanism comprising, in combination, the seal assembly of claim 1 and first and second sealed elements, said first element including a pin element and a link with an end cap pressed over said link, and said second element including a bushing for said pin and another link receiving said bushing in press fit relation, said end cap having a counterbore therein for receiving said first casing and means associated with said other link and bushing for receiving said second casing, one of said first and second casings being sized with respect to its associated link part so as to provide a secondary seal therewith, and being also sized so as to permit rotation relative thereto when said casings are rotating together.

10. A fluid seal assembly comprising, in combination, a cylindrical rubber sleeve having an axially inner and an axially outer end face surface, an axially inner, first seal casing member having at least one axial flange and at least one radial flange, and an axially outer, second seal casing member having axially and radially extending flanges, each of said casing members being made from a relatively rigid material, and each having one of its said radial and axial flanges of each of said first and second casing members bonded to one of said axial end face surfaces of said cylindrical element, cooperating means on said first and second seal casing units for allowing free but limited rotational movement of said first and second casing members relative to each other, said means on said first and second casing elements also being adapted to engage each other when said first element is rotated to a predetermined extent with respect to said second element, and whereby rotation of said first element past said predetermined extent will cause said second casing element to rotate with said first element.

* * * * *

UNITED STATES PATENT AND TRADEMARK OFFICE
CERTIFICATE OF CORRECTION

PATENT NO. : 4,330,134
DATED : May 18, 1982
INVENTOR(S) : Kennth J. Kolinger

It is certified that error appears in the above—identified patent and that said Letters Patent is hereby corrected as shown below:

Column 1, line 26, delete "or", and in place thereof, insert -- of --;

Column 5, line 42, delete "my", and in place thereof, insert -- any --.

Signed and Sealed this

Third Day of August 1982

[SEAL]

Attest:

Attesting Officer

GERALD J. MOSSINGHOFF
Commissioner of Patents and Trademarks